United States Patent
Arroubi et al.

(10) Patent No.: US 7,018,091 B2
(45) Date of Patent: Mar. 28, 2006

(54) SAFETY DEVICE FOR ELECTRIC HOUSEHOLD APPLIANCES

(75) Inventors: Mustapha Arroubi, Villons-les-Buissons (FR); Michel Leforgeais, Fontenay le Pesnel (FR)

(73) Assignee: SEB S.A., Ecully (FR)

( * ) Notice: Subject to any disclaimer, the term of this patent is extended or adjusted under 35 U.S.C. 154(b) by 105 days.

(21) Appl. No.: 10/470,300

(22) PCT Filed: Jan. 28, 2002

(86) PCT No.: PCT/FR02/00335

§ 371 (c)(1),
(2), (4) Date: Jan. 7, 2004

(87) PCT Pub. No.: WO02/060307

PCT Pub. Date: Aug. 8, 2002

(65) Prior Publication Data

US 2004/0100862 A1    May 27, 2004

(30) Foreign Application Priority Data

Jan. 30, 2001  (FR) .................................. 01 01345

(51) Int. Cl.
*A23N 1/00* (2006.01)
*A47J 27/09* (2006.01)
*A47J 27/00* (2006.01)
*B02C 15/00* (2006.01)

(52) U.S. Cl. ...................... 366/199; 366/205; 366/206; 366/601; 99/337; 99/492; 99/510; 241/37.5; 241/92

(58) Field of Classification Search ................ 366/601, 366/206, 205, 314, 199, 197; 99/348, 337, 99/510, 492; 241/37.5, 92
See application file for complete search history.

(56) References Cited

U.S. PATENT DOCUMENTS 5,852,968 A * 12/1998 Sundquist .................... 366/601
5,957,577 A    9/1999 Dickson et al.
6,629,492 B1 * 10/2003 Li ............................... 366/206

FOREIGN PATENT DOCUMENTS

| DE | 30 00 593 | 7/1981 |
|----|-----------|--------|
| DE | 197 29 662 | 1/1999 |
| DE | 199 47 466 | 5/2001 |
| FR | 2 769 199 | 4/1999 |
| WO | WO 00 19878 | 4/2000 |

* cited by examiner

Primary Examiner—Tony G. Soohoo
(74) Attorney, Agent, or Firm—Young & Thompson

(57) ABSTRACT

An electric household appliance for processing foods comprises a main body including an electric motor unit and its control elements, at least a working accessory comprising a tool designed to be driven by the motor unit and a safety device including a first member housed in the appliance main body and a second member connected to the accessory. The member is a transceiver and the second member is a transponder, the transceiver and transponder being designed to be inductively coupled by a radiofrequency or microwave electromagnetic field when the accessory is installed on the appliance body. Preferably, the transponder connected to the accessory comprises a power circuit derived from the electric power induced in the transponder antenna and additional safety elements for deactivating the powering circuit.

11 Claims, 2 Drawing Sheets

SAFETY DEVICE FOR ELECTRIC HOUSEHOLD APPLIANCES

BACKGROUND OF THE INVENTION

The present invention relates to electric household appliances for processing foodstuffs, comprising a principal body enclosing a motor group and its control means, and a working accessory provided with a tool adapted to be driven by the motor group.

The invention relates more particularly to a safety device comprising a first means disposed in the principal body of the apparatus and acting on the control means of the motor group, and a second means connected to the accessory so as to prevent the operation of the apparatus if the accessory is not in place.

In apparatus of this type, a solution currently used for safety devices consists in providing a mechanical device that acts on a switch disposed between the electrical supply and the motor group of the apparatus. These mechanical devices have several drawbacks: they can be disabled rather simply by an unscrupulous user; the mechanical elements can wear and become inoperative; they are sensitive to dirt. Moreover, for certain types of accessories it is difficult to design a mechanical safety which will be aesthetically acceptable. For example, for a transparent mixer bowl of elongated shape enclosed by a cover, it is difficult to design a mechanical safety device for locking the cover, without this device being visible.

Another solution, described in French patent 90 00930 filed Jan. 26, 1990 by the applicant, consists in using a Hall effect detector adapted to detect a magnet secured to the accessory. This type of safety requires a particular construction of the apparatus, because the distance of interaction between the magnet and the detector is small. Moreover, safety is not absolute, because the detector can be maliciously evaded by using a suitable magnet.

The present invention has for its object to eliminate these drawbacks and to provide particularly a reliable safety device which is easily integrated into existing electric household appliances.

SUMMARY OF THE INVENTION

According to the invention, the first means disposed in the principal body of the apparatus is a transceiver comprising an antenna and a transceiver block connected to a current source, and the second means is a transponder, said transceiver and transponder being adapted to be coupled inductively by a radio frequency or hyper-frequency electromagnetic field when the accessory is emplaced on the body of the apparatus.

Thus, one can be assured of the presence of the accessory thanks to a contactless connection which has a sufficiently great range to be used easily in different types of electric household appliances without modifying their structure.

The transponder comprises preferably an electric circuit for supplying current to the transponder from the electric current induced in the antenna of the transponder by the electromagnetic field.

Thanks to this arrangement, there is obtained a safety device whose lifetime is substantially unlimited.

According to a particularly interesting characteristic, the working accessory comprises a supplemental safety means controlling the electrical supply of the transponder so that the latter will have either an active condition or an inactive condition.

For example, this supplemental safety means can be in the form of a switch, arranged between the antenna and the supply circuit, which remains open when the accessory is not correctly locked. Thus, the transponder is no longer supplied and it cannot be recognized by the transceiver disposed in the body of the apparatus.

Thanks to this arrangement, the safety device according to the invention prevents the operation of the apparatus, not only when the accessory is not present, but also if the accessory is not correctly locked.

Other characteristics and advantages of the invention will become apparent from the following description, given by way of non-limiting example, with reference to the accompanying drawings, in which:

DETAILED DESCRIPTION OF THE INVENTION

Figure 1:
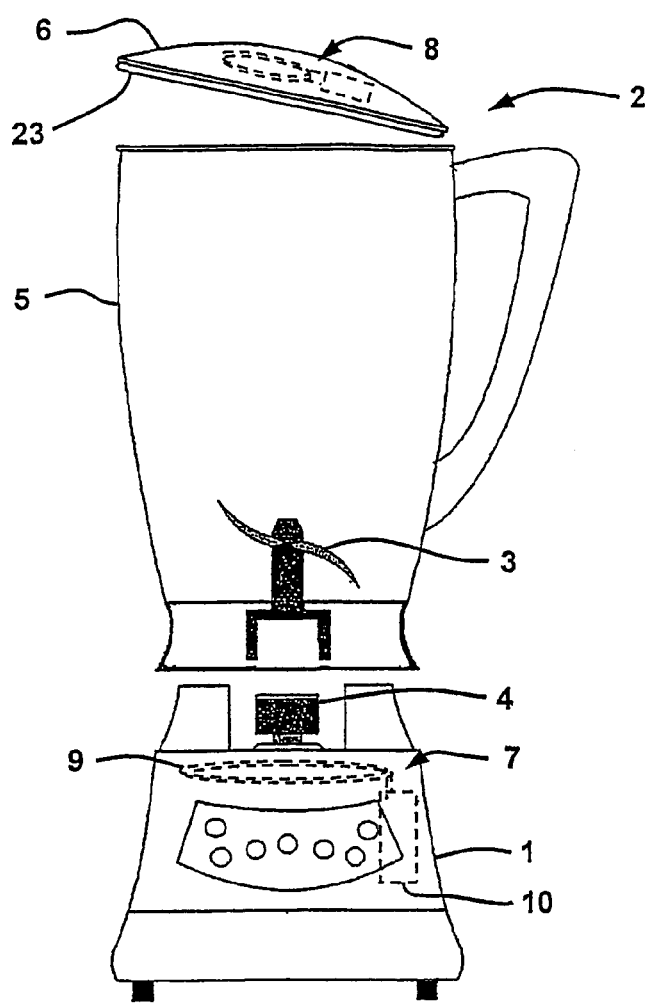
FIG. 1 is a schematic front view of an electric household appliance provided with a safety device according to the invention and of which the accessory, shown not mounted on the body of the apparatus, comprises a bowl and a cover.

In FIG. 1, there is shown schematically an electric household appliance comprising a principal body 1 enclosing a motor group (not shown) and its control means, a working accessory 2 mounted removably and provided with a tool 3 adapted to be driven by the motor group by an output shaft 4 of the motor group. In the illustrated embodiment, the accessory comprises a bowl 5 provided with a rotating tool 3 and closed by a cover 6. But of course, the invention is not limited to electric household apparatus employing this type of accessory. For example, the accessory could comprise a flexible transmission whose end could receive various cleaning brushes, or tools for culinary preparations such as whisks, mixers.

The apparatus is provided with a safety device comprising two means. The first means 7, shown in broken lines, is disposed in the principal body 1 of the apparatus and acts on the control means of the motor group, a second means 8, shown in broken lines, is connected to the accessory 2.

According to the invention, the first means 7 is a transceiver comprising an antenna 9 and a transceiver block 10 connected to a current source, and the second means 8 is a transponder, said transceiver 7 and transponder 8 being adapted to be coupled inductively by a radio frequency or hyper-frequency electromagnetic field when the accessory 2 is correctly in place on the body 1 of the apparatus.

Thus, when the accessory 2 is in place on the body of the apparatus, the transceiver 7 detects the presence of the transponder 8 and sends a signal to the control of the motor group which permits the starting of the apparatus. Thanks to this arrangement there has been provided a safety device without a mechanical connection which acts remotely and which can be used without modification of the structure of the apparatus.

In the illustrated embodiment, the accessory 2 comprising two elements, a bowl 5 and a cover 6, the transponder 8 is connected to the cover 6, which requires the emplacement of all the elements of the accessory before being able to operate the apparatus (emplacement not shown in FIG. 1).

Figure 4:
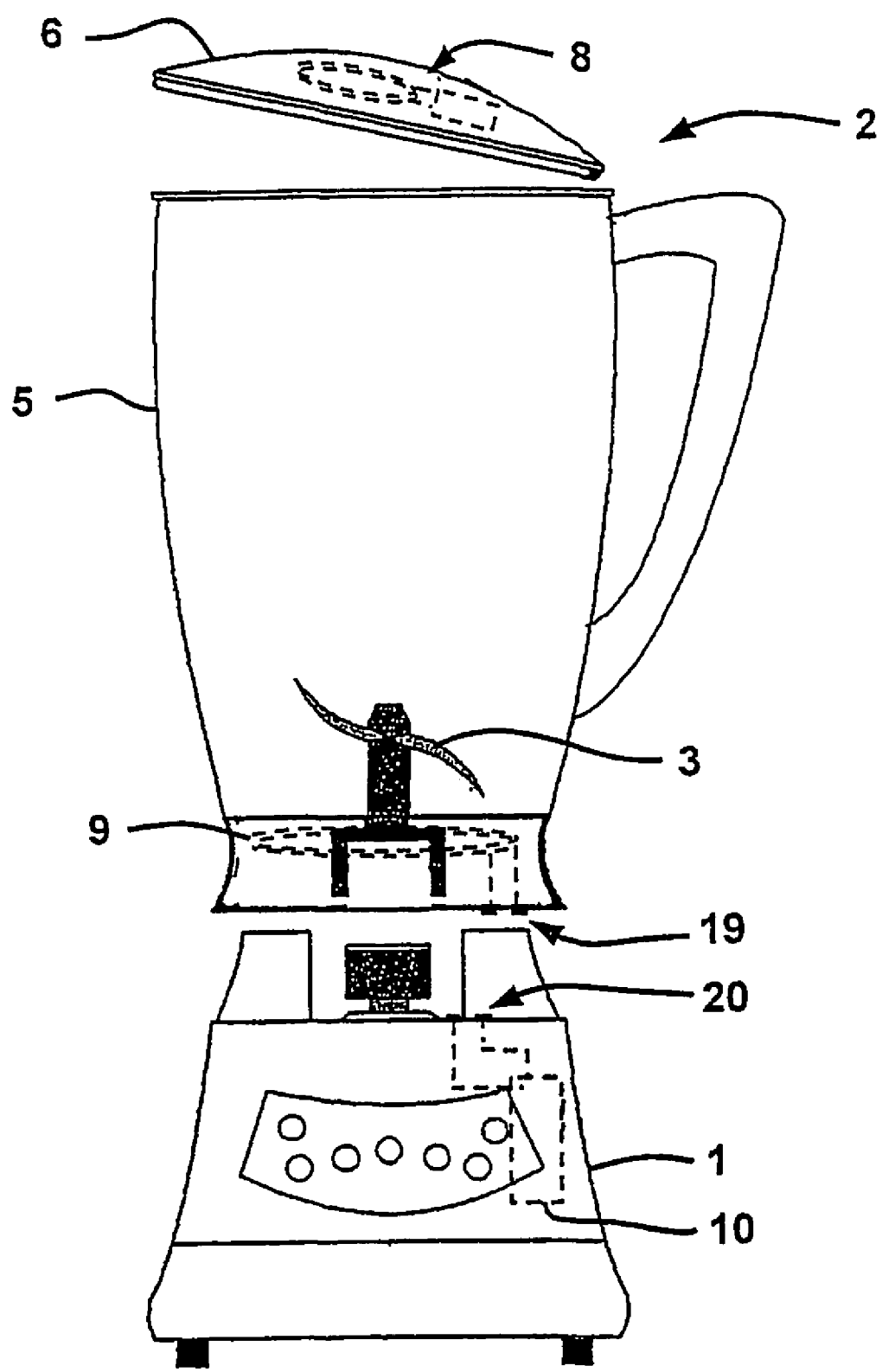
FIG. 4 is a view analogous to FIG. 1, showing a modified embodiment of the portion of the safety device connected to the body of the apparatus.

Of course, the safety device of the invention does not exclude the presence of an additional mechanical safety system at the base of the bowl 5, as is known in the prior art, permitting verifying the perfect locking of the bowl 5 on the apparatus. But so as to obtain this result, the antenna 9 of the transceiver 7 can be disposed in the bowl 5 of the accessory 2, as shown in FIG. 4, and be connected to connection means. These connection means are arranged so as to ensure an electrical connection with the transceiver block 10 disposed in the principal body of the apparatus only when the bowl 5 is correctly locked on the principal body 1 of the apparatus. These connection means can be provided simply by two metallic lugs 19 arranged on the lower surface of the bowl 5 and by two metallized surfaces 20 flush with the upper surface of the body of the apparatus, said lugs 19 and surfaces 20 being disposed so as to be in contact when the bowl is correctly locked. This arrangement prevents any possibility of inductive coupling between the transceiver and the transponder if the bowl 5 is not correctly locked, and thus imposes an additional condition for starting the apparatus.

Figure 2:
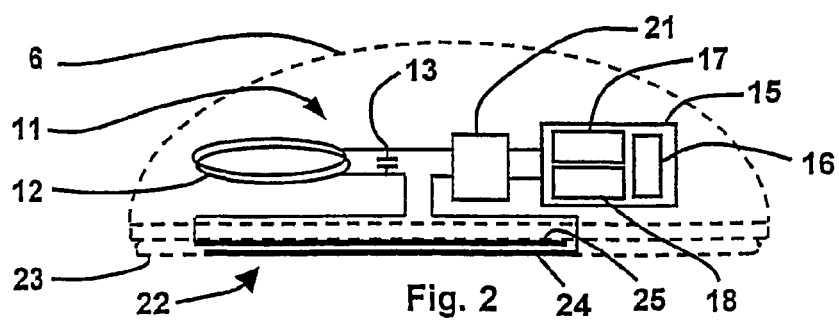
FIG. 2 is an enlarged schematic view according to a first embodiment of the safety means connected to the cover the accessory.

As is better seen in FIG. 2, the transponder comprises an antenna 11 tuned to the frequency of the electromagnetic field emitted by the transceiver. This antenna 11 comprises a winding 12 and preferably a capacitance 13 mounted in parallel at its terminals.

The winding 12 has a diameter and a number of turns calculated so as to detect sufficiently the electromagnetic energy to provide the inductive coupling when the accessory is emplaced on the apparatus. However, the winding 12 should not be over-dimensioned because that would give rise to an untimely detection of the accessory if it is positioned adjacent the apparatus. To this same end, the winding 12 is arranged so as to be substantially perpendicular to the magnetic component of the field generated by the transceiver. Thus, if the accessory is askew, the energy detected by the transponder is substantially less and the inductive coupling with the transceiver is not effected.

The value of the capacitance 13 is calculated such that the resonant circuit thus constituted will be tuned to the frequency of the field created by the transceiver. This field can have a frequency ranging from several tens of kHz to 5 GHz. By way of example, there is used in the case described an electromagnetic field of 125 KHz.

The antenna 11 of the transponder thus defined is connected to an integrated circuit 15. This integrated circuit 15 comprises memory means 16 containing a code, processing means 17 for the signal detected by the antenna, and emission means 18 of the memorized code. The processing means of the signal 17 are adapted to detect whether the antenna 11 is inductively coupled with the transceiver and to trigger the emission of the memorized code. The transceiver thus permits the operation of the motor group only if the code received is correct. The use of a code permits increasing the reliability of the safety device.

In the case of an electric household appliance that can receive various accessories operating at different speeds, it is particularly advantageous that each accessory comprise a transponder whose memory means contains a code proper to said accessory. The transceiver thus comprises means for recognizing the codes of the different accessories and means for sending a speed signal to the control means of the motor group as a function of the recognized code.

The speed signal can be a maximum speed not to be exceeded for the recognized accessory. For example, if the accessory is a kneader, the speed signal will prevent the motor group from exceeding a speed greater than 400 rpm, even if the user positions the speed selector at a higher speed. Thus the risks of damage to the apparatus are avoided.

According to another modification, the speed signal can correspond to the optimum speed of rotation of the accessory. In this case the user no longer has to actuate a start button, the speed of rotation of the motor group will be automatically the most appropriate speed for the accessory emplaced on the apparatus.

The transponder can be supplied by an electric battery, but when the battery is discharged it can no longer fulfill its safety function. To overcome this drawback, the transponder comprises an electric circuit 21 adapted to supply the integrated circuit 15 with current from the electric current induced in the antenna 11 of the transponder by the electromagnetic field. This supply circuit, which generally comprises a condenser and a diode bridge, can be physically included in the integrated circuit 15 of the transponder.

For accessories of plastic material, the transponder is preferably overmolded in the plastic material. This permits obtaining an aesthetic presentation in which the transponder is totally invisible, and increases the protection of the transponder against shocks and moisture.

According to a particularly interesting characteristic of the invention, the cover of the accessory 2 comprises a supplemental safety means, 22 or 26, controlling the electric supply of the integrated circuit 15 of the transponder to cause said integrated circuit 15 to have either an active condition or a passive condition. Thus it is possible to impose a supplemental safety condition, in addition to the presence of the cover, before permitting operation of the motor group.

FIG. 2 shows schematically a first embodiment of the transponder and of the supplemental safety means 22 connected to the cover 6. The supplemental safety means is constituted by a switch 22 mounted between the antenna 11 and the electrical supply circuit 21 of the transponder, said switch 22 being adapted to be in closed position when the cover is correctly locked. When the cover is not correctly locked, the switch 22 in the open position cuts the current supply of the integrated circuit 15 of the transponder, the latter is then in a passive condition and cannot be detected by the transceiver 7.

This embodiment can be made in an equivalent form by arranging the switch 22 between the terminals of the antenna 11 and such that it will be in open position when the cover is correctly locked and that it will be in closed position when the cover is not locked. If the cover is not correctly locked, the switch in closed position short-circuits the supply circuit 21 and the integrated circuit 15 of the transponder assumes a passive condition.

The cover 6, shown in broken lines in FIG. 2, comprises a hollow joint 23 adapted to ensure sealing when the cover 6 closes the bowl 5. Preferably, the switch 22 is then constituted by two conductive tracks (24, 25) extending along the internal cavity of said hollow joint 23, the tracks (24, 25) being arranged so as to be placed in contact when the joint 23 is collapsed by the locking of the cover 6 on the bowl 5. Thanks to this arrangement, it is necessary not only that the cover 6 be present for the apparatus to function, but also that it be locked so that the joint 23 will remain collapsed. The safety device thus provided has the advantage of not having any exposed part which could be damaged or soiled by liquid.

But of course the switch 22 can be in other forms. By way of example, it can be a switch of the pushbutton type, with two metallic lugs adapted to come into contact with a conductive track provided on the upper edge of the bowl, or else a pressure detector. Thus, to cause the integrated circuit of the transponder to pass from a passive condition to an active condition, it suffices that the switch in the open position have an important resistance and a residual resistance that is substantially less in the closed position. But this residual resistance can amount to several tens of ohms.

The switch 22, constituted by the two conductive tracks, shown in FIG. 2, is disposed between the antenna 11 and the supply circuit 21, but obviously the same result could be obtained by arranging the switch 22 between the supply circuit 21 and the integrated circuit 15.

Figure 3:
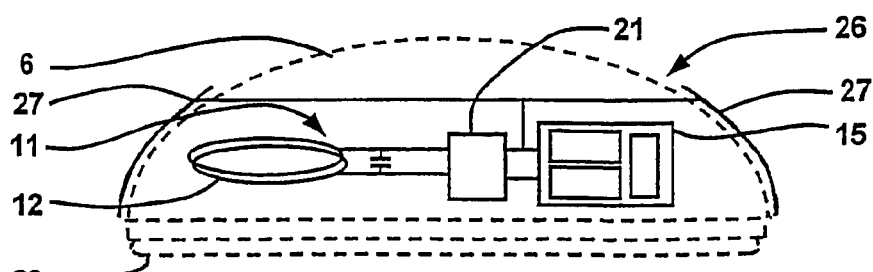
FIG. 3 is a view analogous to FIG. 2, showing a second embodiment of the safety means connected to the cover.

The supplemental safety means controlling the supply circuit can be made differently, as is shown in FIG. 3. According to this embodiment, the supplemental safety means is a tactile member 26 comprising a conductive surface 27 extending over at least a portion of the gripping means for the cover 6. This conductive surface 27 is connected to the electrical supply circuit 21 of the transponder so as to cause the integrated circuit 15 to assume its active condition only in the absence of contact with the tactile member 26.

If the user holds the cover at a small height above the bowl, the transponder is likely to receive sufficient energy to permit the operation of the motor group, but thanks to the arrangement described above, the integrated circuit 15 is rendered inactive. Thus the body of the user, placed in contact with the supply circuit 21 by means of the tactile member 26, creates an important current loss relative to the very low electrical energy in the antenna 11. The integrated circuit 15 of the transponder then assumes an inactive condition because it is no longer correctly supplied.

Preferably, the conductive surface 27 of the tactile member 26 is connected to the continuous positive voltage output of the supply circuit 21, but the applicant has noted that the same result can be obtained by connecting the conductive surface 27 to a terminal of the antenna 11.

Of course, the present invention is suitable for various modifications. It is particularly possible to provide each element with an accessory having several transponder portions. There will then be used transponders provided with a protocol of anti-collision communication which permits the transceiver to verify the presence of all the transponders before permitting starting the electric household appliance.

What is claimed is:

1. Electric household appliance for processing foodstuff, comprising a principal body (1) enclosing an electric motor group and its control means, at least one working accessory (2) comprising a tool (3) adapted to be driven by said motor group arid a safety device comprising two means, a first means (7) disposed in the principal body (1) of the apparatus and acting on the control means of the motor group, and a second means (8) connected to the accessory (2), characterized in that the first means (7) is a transceiver comprising an antenna (9) and a transceiver block (10) connected to a current source, and the second means (8) is a transponder, said transceiver and transponder being adapted to be coupled inductively by a radio frequency or hyper-frequency electromagnetic field when the accessory (2) is emplaced on the body (1) of the apparatus.

2. Electric household apparatus according to claim 1, characterized in that the transponder (8) comprises an antenna (11) tuned to the frequency of the electromagnetic field emitted by the transceiver (7) and an integrated circuit (15) connected to said antenna, said integrated circuit (15) comprising a memory means (16) containing at least one code, processing means (17) for the signal detected by said antenna, and means (18) for emitting the memorized code.

3. Electric household appliance according to claim 2, characterized in that the transponder (8) comprises an electrical circuit (21) adapted to supply the integrated circuit (15) with current from the electric current induced in the antenna (11) of the transponder by the electromagnetic field.

4. Electric household appliance according to claim 3, adapted to receive various accessories operating at different speeds, characterized in that each accessory comprises a transponder whose memorization means contains a code individual to said accessory, the transceiver comprising means for recognizing codes of the different accessories, and means for sending a speed signal to the control means of the motor group as a function of the recognized code.

5. Electric household appliance according to claim 3, whose working accessory is of plastic material, characterized in that the transponder is overmolded in said plastic material.

6. Electric household appliance according to claim 3, characterized in that the working accessory comprises a bowl (5) provided with a rotating tool (3) enclosed by a cover (6), the transponder (8) being connected to said cover (6).

7. Electric household appliance according to claim 6, characterized in that the antenna (9) of the transceiver is disposed in the bowl (5) of the accessory (2) and is connected to connection means, said connection means ensuring an electrical connection with the transceiver block (10) disposed in the principal body of the apparatus only when the bowl (5) is correctly locked on the principal body (1) of the apparatus.

8. Electric household appliance according to claim 6, characterized in that the cover (6) of the accessory comprises a supplemental safety means (22 or 26) controlling the electrical supply of the integrated circuit (15) of the transponder to cause said integrated circuit to assume either an active condition or a passive condition.

9. Electric household appliance according to claim 8, characterized in that the supplemental safety means comprises a switch (22) arranged between the antenna (11) and the electrical supply circuit (21) of the transponder, said switch being adapted to be in closed position when the cover (6) is correctly locked.

10. Electric household appliance according to claim 9, whose cover (6) closing the bowl (5) comprises a hollow sealing joint (23), characterized in that the switch (22) of the supplemental safety means is constituted by two conductive tracks (22, 24) extending along the internal cavity of said hollow joint (23), said tracks being arranged so as to be placed in contact when the joint (23) is collapsed by the locking of the cover (6) on the bowl (5).

11. Electric household appliance according to claim 8, characterized in that the supplemental safety means is a tactile member (26) comprising a conductive surface (27) extending over at least a portion of the gripping means for the cover (6) and connected to the electric supply circuit of the transponder (8) so as to cause the integrated circuit (15) to assume its active condition only in the absence of contact with the tactile member (26).

* * * * *